(12) United States Patent  (10) Patent No.: US 8,782,032 B2
Carver  (45) Date of Patent: Jul. 15, 2014

(54) MINIMIZING VISIBILITY OF STALE CONTENT IN WEB SEARCHING INCLUDING REVISING WEB CRAWL INTERVALS OF DOCUMENTS

(71) Applicant: Google Inc., Mountain View, CA (US)

(72) Inventor: Anton P. T. Carver, Mountain View, CA (US)

(73) Assignee: Google Inc., Mounain View, CA (US)

( * ) Notice: Subject to any disclaimer, the term of this patent is extended or adjusted under 35 U.S.C. 154(b) by 0 days.

(21) Appl. No.: 13/849,355

(22) Filed: Mar. 22, 2013

(65) Prior Publication Data

US 2013/0226897 A1   Aug. 29, 2013

Related U.S. Application Data

(63) Continuation of application No. 13/166,757, filed on Jun. 22, 2011, now Pat. No. 8,407,204, which is a continuation of application No. 10/930,280, filed on Aug. 30, 2004, now Pat. No. 7,987,172.

(51) Int. Cl.
 *G06F 17/30* (2006.01)
(52) U.S. Cl.
 CPC ............................... *G06F 17/30864* (2013.01)
 USPC ............ 707/709; 707/803; 709/217; 709/224
(58) Field of Classification Search
 CPC ................... G06F 17/30864; G06F 17/30221; G06F 17/30661; G06F 17/30011; G06F 17/30867
 USPC .......... 707/709, 706, 708, 710, 803, E17.108, 707/E17.116, E17.117; 709/217, 224
 See application file for complete search history.

(56) References Cited

U.S. PATENT DOCUMENTS 4,312,009 A   1/1982 Lange
5,521,140 A   5/1996 Matsuda et al.
(Continued)

FOREIGN PATENT DOCUMENTS

WO   WO 01/50320   7/2001
WO   WO 01/86507   11/2001

OTHER PUBLICATIONS

Hadrien Bullot, M. K. Mohania and S.K. Gupta "A data-mining approach for optimizing performance of an incremental crawler" -Web Intelligence, 2003. WI 2003, Oct. 13-17, 2003. Proceedings. IEEE/WIC International Conference on—(pp. 1-7 or 610-615).*

(Continued)

*Primary Examiner* — Anh Ly
(74) *Attorney, Agent, or Firm* — Morgan, Lewis & Bockius LLP

(57) ABSTRACT

A method includes comparing a first instance with a second instance of a document in a plurality of documents. The first instance is obtained from a remote location at a specified time before the second instance is obtained from the remote location, and (i) the specified time is determined in accordance with a first crawl interval associated with the document, (ii) each document in the plurality of documents is assigned to a tier in a plurality of tiers, each tier having a distinct associated range of web crawl intervals, and (iii) the first crawl interval is assigned a first tier. The method also includes computing a second crawl interval for the document, which is a function of the document comparison; and determining whether the second crawl interval is in the first tier. When the second crawl interval is not, the first document is reassigned to another tier.

32 Claims, 4 Drawing Sheets

(56) References Cited

U.S. PATENT DOCUMENTS

| | | | |
|---|---|---|---|
| 5,594,480 A | 1/1997 | Sato et al. | |
| 5,634,062 A | 5/1997 | Shimizu et al. | |
| 5,801,702 A | 9/1998 | Dolan et al. | |
| 5,832,494 A | 11/1998 | Egger et al. | |
| 5,898,836 A | 4/1999 | Freivald et al. | |
| 6,003,060 A | 12/1999 | Aznar et al. | |
| 6,012,087 A | 1/2000 | Freivald et al. | |
| 6,049,804 A | 4/2000 | Burgess et al. | |
| 6,068,363 A | 5/2000 | Saito | |
| 6,189,019 B1 | 2/2001 | Blumer et al. | |
| 6,219,818 B1* | 4/2001 | Freivald et al. | 714/799 |
| 6,243,091 B1 | 6/2001 | Berstis | |
| 6,263,350 B1 | 7/2001 | Wollrath et al. | |
| 6,263,364 B1 | 7/2001 | Najork et al. | |
| 6,269,370 B1 | 7/2001 | Kirsch | |
| 6,285,999 B1 | 9/2001 | Page | |
| 6,321,265 B1 | 11/2001 | Najork et al. | |
| 6,336,123 B2 | 1/2002 | Inoue et al. | |
| 6,351,755 B1 | 2/2002 | Najork et al. | |
| 6,377,984 B1 | 4/2002 | Najork et al. | |
| 6,404,446 B1 | 6/2002 | Bates et al. | |
| 6,418,433 B1 | 7/2002 | Chakrabarti et al. | |
| 6,418,452 B1 | 7/2002 | Kraft et al. | |
| 6,418,453 B1 | 7/2002 | Kraft et al. | |
| 6,424,966 B1 | 7/2002 | Meyerzon et al. | |
| 6,547,829 B1 | 4/2003 | Meyerzon et al. | |
| 6,594,662 B1 | 7/2003 | Sieffert et al. | |
| 6,631,369 B1 | 10/2003 | Meyerzon et al. | |
| 6,638,314 B1 | 10/2003 | Meyerzon et al. | |
| 6,701,350 B1 | 3/2004 | Mitchell | |
| 6,751,612 B1* | 6/2004 | Schuetze et al. | 707/709 |
| 6,763,362 B2 | 7/2004 | McKeeth | |
| 6,772,203 B1 | 8/2004 | Feiertag et al. | |
| 6,836,768 B1 | 12/2004 | Hirsch | |
| 6,950,874 B2 | 9/2005 | Chang et al. | |
| 6,952,730 B1 | 10/2005 | Najork et al. | |
| 6,993,534 B2 | 1/2006 | Denesuk et al. | |
| 7,043,473 B1 | 5/2006 | Rassool et al. | |
| 7,047,491 B2 | 5/2006 | Schubert et al. | |
| 7,080,073 B1 | 7/2006 | Jiang et al. | |
| 7,089,233 B2 | 8/2006 | Osias | |
| 7,139,747 B1 | 11/2006 | Najork | |
| 7,148,991 B2 | 12/2006 | Suzuki et al. | |
| 7,171,619 B1 | 1/2007 | Bianco | |
| 7,200,592 B2 | 4/2007 | Goodwin et al. | |
| 7,231,606 B2 | 6/2007 | Miller et al. | |
| 7,260,543 B1 | 8/2007 | Saulpaugh et al. | |
| 7,299,219 B2 | 11/2007 | Green et al. | |
| 7,308,643 B1* | 12/2007 | Zhu et al. | 715/206 |
| 7,310,632 B2 | 12/2007 | Meek et al. | |
| 7,343,412 B1 | 3/2008 | Zimowski | |
| 7,346,839 B2 | 3/2008 | Acharya et al. | |
| 7,447,777 B1 | 11/2008 | Singh Ahuja et al. | |
| 7,454,410 B2 | 11/2008 | Squillante et al. | |
| 7,475,069 B2 | 1/2009 | Blackman et al. | |
| 7,483,891 B2 | 1/2009 | Liu et al. | |
| 7,565,423 B1 | 7/2009 | Fredricksen | |
| 7,725,452 B1 | 5/2010 | Randall | |
| 7,769,742 B1 | 8/2010 | Brawer et al. | |
| 7,966,337 B2 | 6/2011 | Blackman et al. | |
| 7,987,172 B1* | 7/2011 | Carver | 707/709 |
| 8,042,112 B1 | 10/2011 | Zhu et al. | |
| 8,161,033 B2 | 4/2012 | Randall | |
| 8,180,760 B1* | 5/2012 | Carver et al. | 707/708 |
| 8,392,396 B1* | 3/2013 | Carver et al. | 707/708 |
| 8,407,204 B2* | 3/2013 | Carver | 707/709 |
| 8,639,690 B2* | 1/2014 | Dean et al. | 707/725 |
| 2002/0010682 A1 | 1/2002 | Johnson | |
| 2002/0016729 A1* | 2/2002 | Breitenbach et al. | 705/9 |
| 2002/0023158 A1 | 2/2002 | Polizzi et al. | |
| 2002/0052928 A1 | 5/2002 | Stern et al. | |
| 2002/0065827 A1 | 5/2002 | Christie et al. | |
| 2002/0073188 A1 | 6/2002 | Rawson, III | |
| 2002/0087515 A1 | 7/2002 | Swannack et al. | |
| 2002/0099602 A1 | 7/2002 | Moskowitz et al. | |
| 2002/0129062 A1 | 9/2002 | Luparello | |
| 2002/0143932 A1* | 10/2002 | Quintero et al. | 709/224 |
| 2002/0152201 A1* | 10/2002 | Nanavati et al. | 707/3 |
| 2003/0061260 A1 | 3/2003 | Rajkumar | |
| 2003/0126136 A1 | 7/2003 | Omoigui | |
| 2003/0131005 A1 | 7/2003 | Berry | |
| 2003/0158839 A1 | 8/2003 | Faybishenko et al. | |
| 2004/0044962 A1* | 3/2004 | Green et al. | 715/513 |
| 2004/0064432 A1* | 4/2004 | Oetringer et al. | 707/1 |
| 2004/0064442 A1* | 4/2004 | Popovitch | 707/3 |
| 2004/0088369 A1 | 5/2004 | Yeager et al. | |
| 2004/0128285 A1 | 7/2004 | Green et al. | |
| 2004/0225642 A1 | 11/2004 | Squillante et al. | |
| 2004/0225644 A1* | 11/2004 | Squillante et al. | 707/3 |
| 2005/0071766 A1* | 3/2005 | Brill et al. | 715/738 |
| 2005/0086206 A1 | 4/2005 | Balasubramanian et al. | |
| 2005/0102270 A1* | 5/2005 | Risvik et al. | 707/2 |
| 2005/0154746 A1* | 7/2005 | Liu et al. | 707/101 |
| 2005/0165778 A1* | 7/2005 | Obata et al. | 707/5 |
| 2005/0192936 A1* | 9/2005 | Meek et al. | 707/3 |
| 2005/0210008 A1* | 9/2005 | Tran et al. | 707/3 |
| 2005/0216522 A1 | 9/2005 | Gomes | |
| 2005/0240253 A1* | 10/2005 | Tyler et al. | 607/134 |
| 2006/0036605 A1* | 2/2006 | Powell et al. | 707/10 |
| 2006/0069663 A1 | 3/2006 | Adar et al. | |
| 2006/0277175 A1* | 12/2006 | Jiang et al. | 707/5 |
| 2007/0156774 A1* | 7/2007 | Gomes | 707/200 |
| 2007/0214133 A1* | 9/2007 | Liberty et al. | 707/5 |
| 2009/0037393 A1 | 2/2009 | Fredricksen et al. | |
| 2010/0241621 A1 | 9/2010 | Randall | |
| 2011/0258176 A1* | 10/2011 | Carver | 707/709 |
| 2012/0066576 A1 | 3/2012 | Zhu et al. | |
| 2012/0173552 A1* | 7/2012 | Zhu et al. | 707/752 |
| 2012/0317187 A1* | 12/2012 | Fredricksen et al. | 709/203 |

OTHER PUBLICATIONS

Knut Magne Risvik and Rolf Michelsen—"Search Engines and Web Dynamics" —Computer Networks 39, (2002) pp. 289-302.*
Ali, What's Changed? Measuring Document Change in Web Crawling for Search Engines, SPIRE 2003, LNCS 2857, 2003, p. 28-42, Springer-Verlag, Berlin, Germany.
Arasu, Searching the Web, ACM Transactions on Internet Technology, ACM Transactions on Internet Technology, vol. 1, No. 1, Aug. 2001, pp. 2-43.
Baeza-Yates, Balancing Volume, Quality and Freshness in Web Crawling, Center for Web Research, Dept. of Computer Science, University of Chile, 2002, pp. 1-10.
Brandman, Crawler-Friendly Web Servers, ACM SIGMETRICS Performance Evaluatin Review, vol. 28, Issue 2, Sep. 2000, pp. 9-14.
Brin, The Anatomy of a Large-Scale Hypertextual Web Search Engine, In Proc. of the 7th International World Wide Web Conference, 1998, pp. 1-26.
Brusilovsky, Map-Based Horizontal Navigation in Educations Hypertext, ACM Press, Jun. 2002, pp. 1-10.
Bullot, A Data-Mining Approach for Optimizing Performance of an Incremental Crawler, WI '03, Oct. 13-17, 2003, pp. 610-615.
Buyukkokten, Power Browser: Efficient Web Browsing for PDA's, Apr. 1-6, 2000, 8 pgs.
Cho, Crawling the Web: Discovery and Maintenance of Large-Scale Web Data, PhD Thesis, Dept. of Computer Science, Stanford University, Nov. 2001, 188 pages.
Cho, Effectiver Page Refresh Policies for Web Crawlers, ACM Transactions on Database Systems, vol. 28, No. 4, Dec. 2003, pp. 390-426.
Cho, Efficient Crawling Through URL Ordering, Computer Networks and ISDN Systems, vol. 30, Issues 1-7, Apr. 1998, pp. 161-172.
Cho, Estimating Frequency of Change, ACM Transactions on Internet Technology, vol. 3, No. 3, Aug. 2003, p. 256-290.
Cho, Synchronizing a Database to Improve Freshness, MOD 2000, Dallas, TX, Jun. 2000, pp. 117-128.
Cho, The Evolution of the Web and Implications for an Incremental Crawler, Proceedings of the 26th VLDB Conf., Cairo, Egypt, 2000, pp. 200-209.
Coffman, Optimal Robot Scheduling for Web Search Engines, Tech. Rep. RR3317, 1997, 19 pages.

(56) References Cited

OTHER PUBLICATIONS

Douglis, Rate of Change and Other Metrics: a Live Study of the World Wide Web, USENIX Symposium on Internetworking Technologies and Systems, Monterey, CA, Dec. 1997, pp. 1 and 1-13.
Douglis, The AT&T Internet Difference Engine: Tracking and Viewing Changes on the Web, World Wide Web, vol. 1, Mar. 1998, pp. 27-44.
Fetterly, A Large-Scale Study of the Evolution of Web Pages, WWW 2003, Budapest, Hungary, May 20-24, 2003, pp. 669-678.
Haveliwala, Topic-Sensitive PageRank, WWW2002, Honolulu, HI, May 7-11, 2002, 10 pages.
Henzinger, Web Information Retrieval—an Algorithmic Perspective, ESA 2000, LNCS 1879, 2000, pp. 1-8, Springer-Verlag, Berlin, Germany.
Heydon, Mercator: A Scalable, Extensible Web Crawler, World Wide Web, vol. 2, No. 4, Dec. 1999, pp. 219-229.
Hirai, WebBase: a Repository of Web Pages, Computer Networks, vol. 33, Jun. 2000, pp. 277-293.
Introna, Defining the Web: The Politics of Search Engines, Computer, vol. 22, Issue 1, Jan. 2000, pp. 54-62.
Jeh, Scaling Personalized Web Search, WWW2003, Budapest, Hungary, May 20-24, 2003, pp. 271-279.
Kamvar, Exploiting the Block Structure of the Web for Computing PageRank, Stanford University Technical Report, 2003, 13 pages.
Klemm, WebCompanion: A Friendly Client-Side Web Prefetching Agent, IEEE Transactions on Knowledge and Data Engineering, vol. 11, No. 4, Jul./Aug. 1999, pp. 577-594.
Lagrange Multiplier, Wikipedia, Jun. 3, 2011, 14 pgs.
Lee, Intelligent Agents for Matching Information Providers and Consumers on the World-Wide-Web, Proc. of the 13th Annual Hawaii International Conf. on System, 1997, 11 pages.
Najork, Bredth-First Search Crawling Yields High Quality Pages, WWW10, May 10-12, 2001, Hong Kong, pp. 114-118.
Najork, High-Performance Web Crawling, Sep. 26, 2001, 26 pgs.
Nekrestyanov, Building Topic-Specific Collections With Intelligent Agents, 1999, 13 pgs.
Jain, Office Action, U.S. Appl. No. 11/394,619, Sep. 23, 2010, 22 pgs.
Pandey, Monitoring the Dynamic Web to Respond to Continuous Queries, WWW2003, Dudapest, Hungary, May 2024, 2003, pp. 659-668.
Pretto, A Theoretical Analysis of Google's Pagerank, Sep. 11-13, 2002, 14 pgs.
Randall, Office Action, U.S. Appl. No. 10/853,627, May 12, 2008, 12 pgs.
Shkapenyuk, Design and Implementation of a High-Performance Distributed Web Crawler, ICDE '02, San Jose, CA, Feb. 26-Mar. 1, 2002, p. 357-368.
Suel, Odissea: A Peer-to-Peer Architecture for Scalable Web Search and Information Retrieval, WebDB, San Diego, Ca, Jun. 12-13, 2003, pp. 1-6.
Wolf, Optimal Crawling Strategies for Web Search Engines, WWW 2002, Honolulu, Hawaii, May 7-11, 2002, pp. 136-147.

\* cited by examiner

MINIMIZING VISIBILITY OF STALE CONTENT IN WEB SEARCHING INCLUDING REVISING WEB CRAWL INTERVALS OF DOCUMENTS

RELATED APPLICATIONS

This application is a continuation of U.S. application Ser. No. 13/166,757, now U.S. Pat. No. 8,407,204, filed Jun. 22, 2011, entitled "Minimizing Visibility of Stale Content in Web Searching Including Revising Web Crawl Intervals of Documents," which is a continuation of U.S. application Ser. No. 10/930,280, now U.S. Pat. No. 7,987,172, filed Aug. 30, 2004. All above-mentioned patents and patent applications are hereby incorporated by reference in their entities.

TECHNICAL FIELD

The present disclosure relates generally to the field of search engines for locating documents in a computer network system, and in particular, to a system and method for minimizing the visibility of stale data through a web search engine.

BACKGROUND

Search engines provide a powerful tool for locating documents in a large database of documents, such as the documents on the Internet or the documents stored on the computers of an Intranet. In the context of this application, a document is defined as a combination of a document address, e.g., a universal resource locator (URL), and a document content.

A typical structure of a web search engine comprises a front end and a back end. The front end includes a query server for receiving a search query submitted by a user and displaying search results to the user, and a query processor for transforming the search query into a search request understood by the back end of the web search engine. The back end includes one or more web crawlers for retrieving documents from the Internet, a scheduler for providing addresses of the documents to the web crawlers, an indexer for indexing the documents retrieved by the web crawlers and one or more databases for storing information of the retrieved documents, e.g., the indexes of the documents. Upon receipt of a search request, the front end searches the databases, identifies documents whose contents match the search request and returns them as the search results to the requester.

There are billions of documents accessible through the Internet. The life expectancy of a document's content (after which its contents may be replaced or changed) may vary from a few years, to a few seconds. Every day, many thousands of new and revised documents are posted by various web servers all over the world, while other documents are deleted from their hosting web servers and are therefore no longer accessible. As a result, at least some of the document information stored in a web search engine is likely to be stale, even if the web search engine is continuously crawling the web so as to update its database. Stale content in a search engine database is said to be visible when the search engine returns a result (e.g., in response to search query) that is based on stale information. In some cases, the stale content in the search engine may have no particular significance, because the changes to the documents listed in a search result are minor, or the relevance of the documents remains substantially the same. However, in other cases the search result may include links to documents that no longer exist, or whose content has changed such that the result is no longer relevant to the query (or has lower relevance to the query than the prior content of the documents). For purposes of this document, stale content is assumed to be visible, whenever search results are returned based on the stale content, even if the search results are still useful to the user.

In general, it would be desirable to keep the document information in a search engine's databases as fresh as possible, while avoiding needless refreshing of content that is highly static. More generally, it would be desirable to schedule documents for downloading by a web crawler so as to minimize the visibility of stale document information in the databases of the search engine.

SUMMARY

A web crawling system associates an appropriate web crawl interval with a document so that the probability of the document's stale content being used by a search engine is maintained below an acceptable level. Assuming sufficient crawl bandwidth, the search engine crawls each document at its associated web crawl interval.

In some embodiments, a method for scheduling a document crawl interval, includes: at a computer system having one or more processors and memory storing one or more programs for execution by the one or more processors: comparing a first instance of a document in a plurality of documents with a second instance of the document, thereby obtaining a document comparison. The first instance of the document is obtained from a remote location at a specified time before the second instance of the document is obtained from the remote location. The specified time is determined in accordance with a first crawl interval associated with the document. Each document in the plurality of documents is assigned to a tier in a plurality of tiers, each tier in the plurality of tiers having a distinct associated range of web crawl intervals, and the first crawl interval is assigned a first tier in the plurality of tiers. The method also includes computing a second crawl interval for the document; and determining whether the second crawl interval is in the first tier. The second crawl interval is a function of the document comparison. When the second crawl interval is not in the first tier, the first document is reassigned to another tier in the plurality of tiers.

In some embodiments, the web crawl interval of a document is identified by an iterative process that starts with an initial estimate of the web crawl interval. The iterative process, after crawling a document multiple times at different time intervals and analyzing the content changes associated with the crawling results, converges to a time interval that is deemed most appropriate for this document. This time interval is associated with the document as its web crawl interval.

In one embodiment, documents are partitioned into multiple tiers, each tier including a plurality of documents sharing similar web crawl intervals. After each crawl, the search engine re-evaluates a document's web crawl interval and determines if the document should be moved from its current tier to another tier.

In another embodiment, changes to a document's content are divided into two categories, critical content changes referring to those changes that occur to a predetermined portion of a document and non-critical content changes covering all other changes to the document. During the course of updating a document's web crawl interval, the search engine takes into account only critical content changes and ignores all non-critical content changes to the document.

BRIEF DESCRIPTION OF THE DRAWINGS

The aforementioned features and advantages of the embodiments disclosed herein as well as additional features and advantages thereof will be more clearly understood hereinafter as a result of a detailed description when taken in conjunction with the drawings.

Like reference numerals refer to corresponding parts throughout the several views of the drawings.

DESCRIPTION OF EMBODIMENTS

Figure 1:
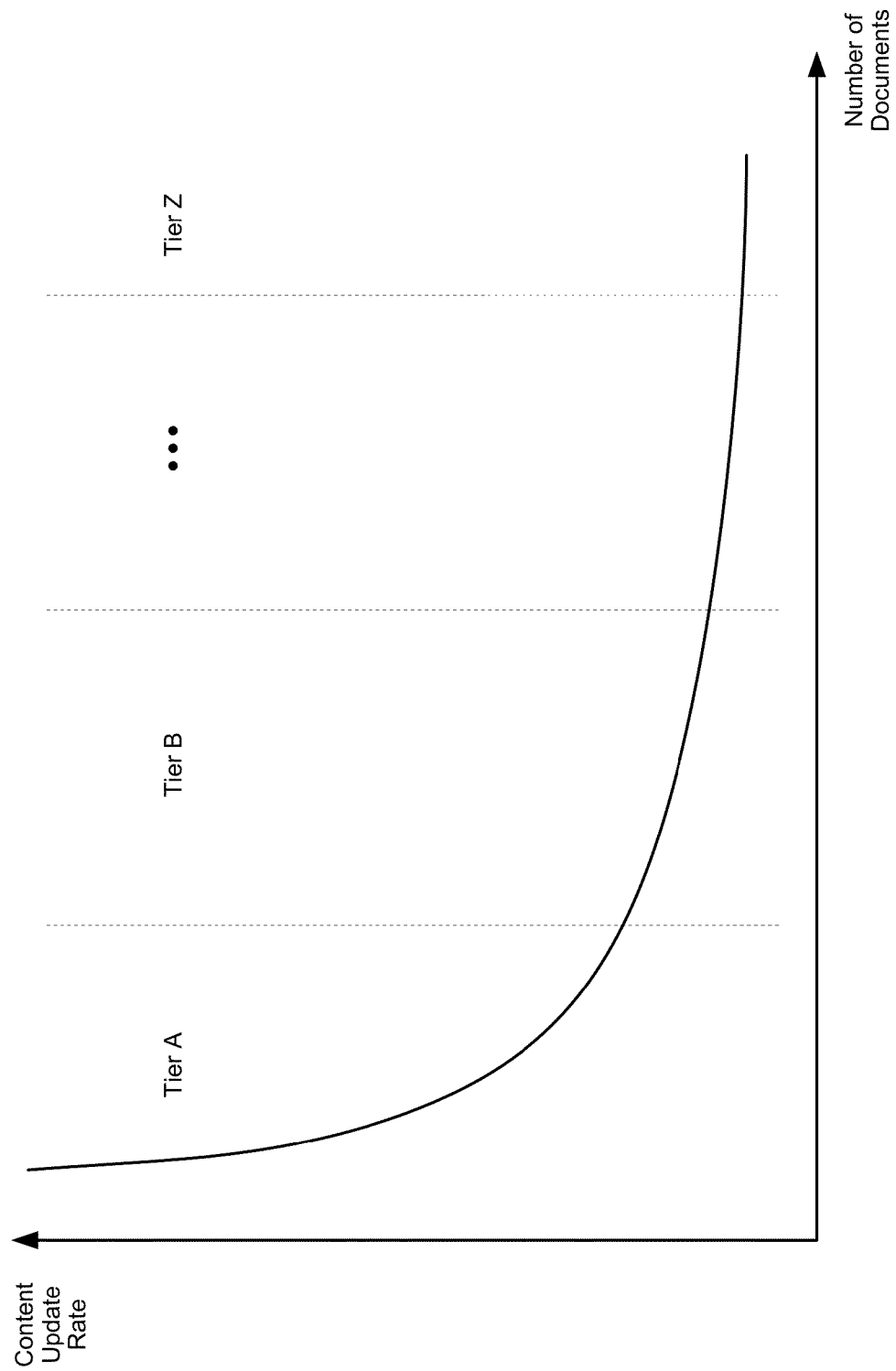
FIG. 1 schematically represents the distribution of the content update rates of documents on the Internet as an L-shaped curve.

It is expected that a small number of documents on the Internet will have content that changes frequently and a larger number of documents will have content that changes rather infrequently. Document update intervals may range, for example, from once every few seconds to once every few years. FIG. 1 schematically illustrates this as an L-shaped distribution of content update rates for documents. There are a relatively small number of documents having high content update rates, as shown at the left portion of the L-shaped curve. On the other hand, as shown at the right portion of the curve, there are a large number of documents with much lower content update rates. Based on the distribution of content update rates, a search engine may incorporate a multi-tier data structure to group a certain number of documents whose content update rates fall within a particular portion of the L-shaped curve. This grouping may be used to ease the administrative overhead of scheduling efforts to obtain new copies of the documents. On the other hand, in another embodiment, such a tier data structure is not used and documents are not grouped into tiers for crawling purposes. The concepts described below would apply whether or not a tiered structure was used.

As mentioned above, a tiered structure may allow groups of documents to be treated together for various administrative and processing purposes. As shown in FIG. 1, "Tier A" includes documents having the highest content update rates and "Tier Z" includes documents having the lowest content update rates. Typically, a document from a higher tier, e.g., Tier A, is given a higher crawling priority, or a higher crawl repetition rate, than any document from a lower tier, e.g., Tier B, and vice versa.

Figure 2:
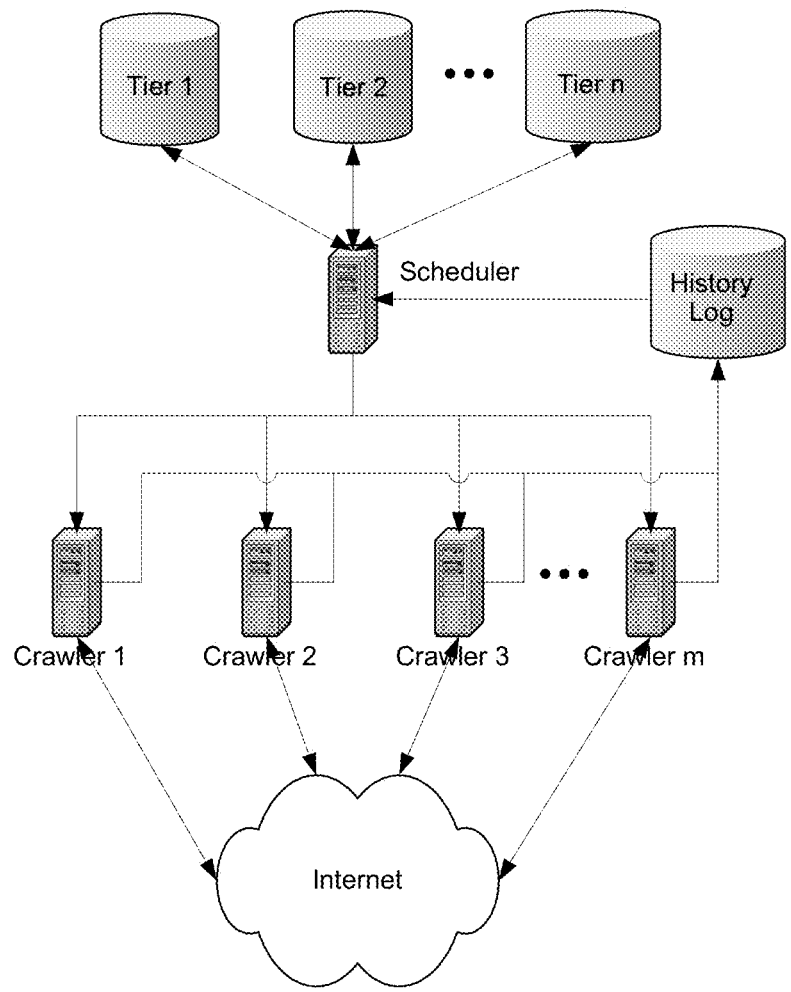
FIG. 2 depicts a search engine system that implements a multi-tier data structure for the billions of documents on the Internet.

FIG. 2 depicts a search engine system 200 that implements the multi-tier data structure as suggested above. Information for the documents falling into "Tier A" is stored in a database "Tier 1" and so on. Each document is characterized by a set of parameters including, e.g., a URL, a content fingerprint, a Boolean value suggesting whether there is a critical content change to the document, an actual web crawl interval identified by the search engine during previous web crawl(s) and a web crawl interval recommended for the forthcoming web crawl(s). The parameters could also include a past history of the N previous actual web crawl intervals. This might include information indicating for which intervals the content had changed and for which intervals the content had not changed. Using these values, it would be possible to determine an average interval length over which the document's content had not changed and an average interval length over which the document's content had changed. In other embodiment, a running average of the X previous actual web crawl intervals could be used or stored. In other embodiments, the set of parameters characterizing a document may be a subset of those identified above, or may include a subset of the parameters identified above plus other parameters not identified above.

The multi-tier databases implementing the multi-tier data structure submit web crawl requests to a scheduler, suggesting which documents should be crawled according to their respective web crawl intervals. In response, the scheduler examines the workload and capacity of its multiple web crawlers and then dispatches a particular web crawler, e.g., Crawler 3, to a web server on the Internet hosting the document.

After retrieving a new copy of the document from the hosting web server, the web crawler passes the new copy to a history log database. The history log database also has access to the previous copy of the document stored in the search engine system. Upon receipt of the new copy, the history log database retrieves the previous copy and submits both copies to the scheduler. The scheduler determines whether to modify the document's web crawl interval using information it has gathered about the document and updates one of the multi-tier databases accordingly. Of course, if this is the first time that a document has been crawled, the search engine will not have a previous copy to provide the scheduler. In this case, the scheduler assigns an initial web crawl interval to the document. The initial crawl interval could be determined in any of a number of ways, some of which are described below.

Figure 3:
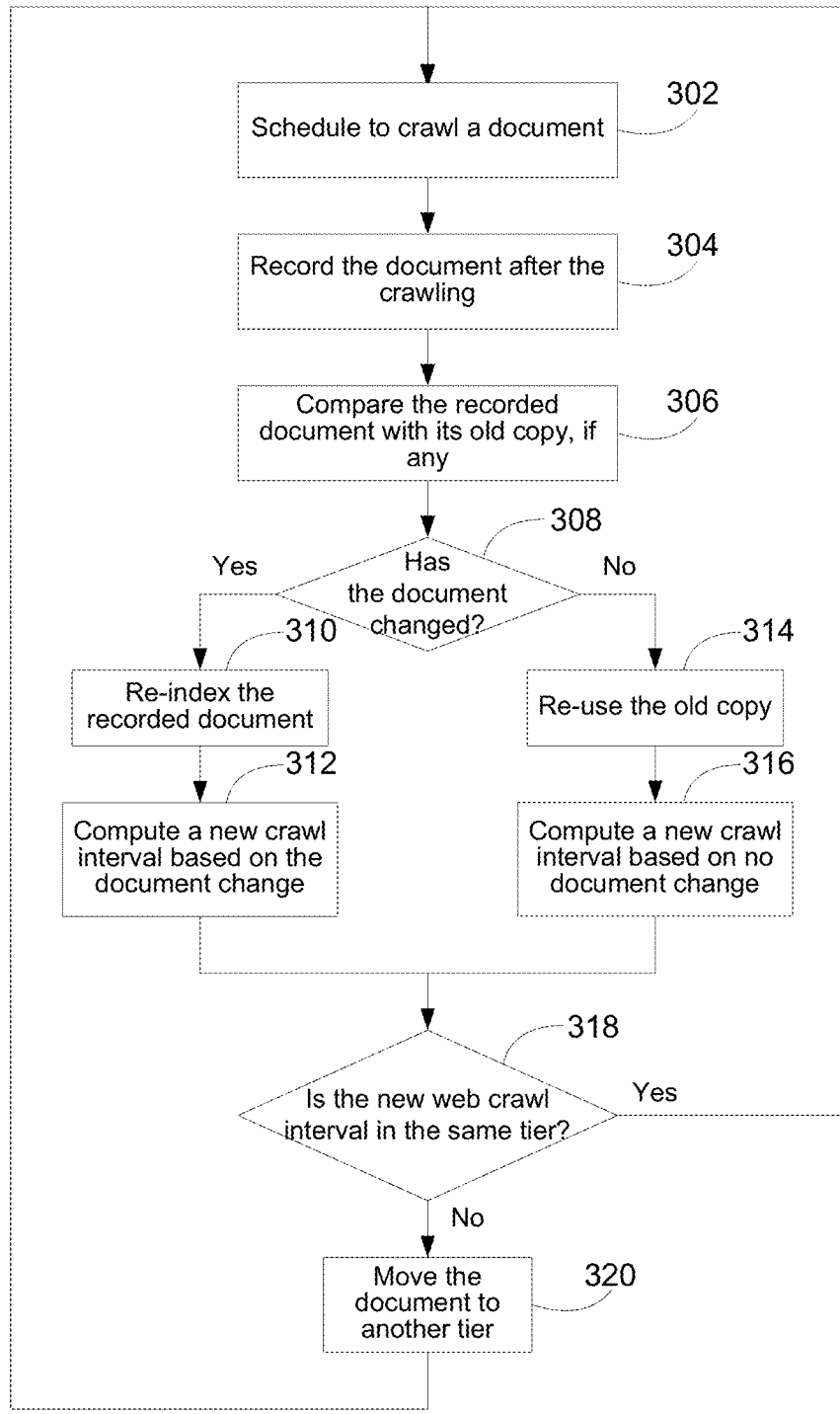
FIG. 3 is a flowchart illustrating a dynamic crawling priority update strategy in accordance with an embodiment.

FIG. 3 is a flowchart illustrating a dynamic web crawl interval update strategy in accordance with one embodiment of the present disclosure. After receiving information of a particular document from the scheduler, one of the multi-tier databases of FIG. 2 schedules a web crawl request for the document based upon a desired web crawl interval for the document (302). Subsequently, one web crawler is invoked by the request to retrieve a new copy of the document and record it in the history log database (304). The history log database then passes the newly recorded document and its previous copy, if any, to the scheduler. The scheduler compares the content of the newly recorded document and that of the previous copy (306) to determine if the document content has changed (308). In some embodiments, the determination made at 308 is whether there have been any critical content changes in the document. The scheduler may indicate whether or not such a change has been detected in the history log and associate it with the particular crawl interval.

The simplest way to determine content changes is to compare the content fingerprint of the document before and after the recent crawl. If the content fingerprints are equal, the document has not changed, otherwise it has. Changes can be described as critical or non-critical and that determination may depend on the portion of the document changed, or the context of the changes, rather than the amount of text or content changed. Sometimes a change to a document may be insubstantial, e.g., the change of advertisements associated with a document. In this case, it is more appropriate to ignore those accessory materials in a document prior to making content comparisons. In other cases, e.g., as part of a product search, not every piece of information in a document is weighted equally by a potential user. For instance, the user may care more about the unit price of the product and the availability of the product. In this case, it is more appropriate to focus on the changes associated with information that is deemed critical to a potential user rather than something that is less significant, e.g., a change in a product's color. Accordingly, the determination of criticality or materiality is a function of the use and application of the documents.

Alternatively, a document could be considered a collection of individual features which change from time to time. Changes associated with different features would be accorded different levels of importance. In this instance, a document would be considered "changed" if the combination of a set of weighted features whose values have changed exceeds a certain threshold. For example in the equation below, when C is greater than some defined value, then the document is deemed to have materially changed:

$$C = \sum_{i=0}^{n-1} weight_i * feature_i$$

where n is the number of features whose values have changed. Alternately, n may be the total number of features and the weights may be assigned non-zero values for only those features whose values have changed.

If the document has changed materially since the last crawl (308—Yes), the scheduler sends a notice to a content indexer (not shown), which replaces index entries for the prior version of the document with index entries for the current version of the document (310). Next, the scheduler computes a new web crawl interval (312) for the document based on its old interval and additional information, e.g., the document's importance (as measured by a score, such as pagerank), update rate and/or click rate. If the document's content has not been changed or if the content changes are non-critical (308—No), there is no need to re-index the document (314). However, the scheduler still computes a new web crawl interval (316) for the document based on its old one and other information, in particular, based on the fact that there was no critical content change to the document. A more in-depth discussion regarding the determination of the new web crawl interval is provided below. Of course, the scheduler could be configured to re-index the document and compute a new crawl interval on any change to the content, material or not.

Next, the scheduler records the newly determined web crawl interval at one of the multi-tier databases for later use. However, since the document's web crawl interval may be different from the one used previously, the document's affiliation with a particular tier may terminate as well. More specifically, if the recomputed crawl interval belongs to the interval range associated with a different tier (318—No), the document and its associate web crawl interval are moved to the other tier (320). Otherwise (318—Yes), the document and its new web crawl interval are recorded in the same tier database as previously. Alternately, the termination of whether to move the document to another tier, or to keep it in the current tier, may be based on the magnitude of the change in the document's web crawl interval.

When determining a new crawl interval, it is desirable to choose one which will reduce the probability that in response to a user request represented by a set of query terms, the web search engine returns the address of a document matching the request based on stale content. Stale content no longer reflects the current state of the document stored on the web server. Such a probability is a function of a user view rate on the document (which is a reflection on how frequently a page is viewed); a document update rate (which is an indication of how frequently the page is updated on the web host server); and the web crawl interval (which is an indication of the time between until the crawler obtains an updated copy of the document from its web server). This function can be expressed as:

Probability(Seen_Stale_Data)=Function(User_View_Rate,Document_Update_Rate,Web_Crawl_Interval).

In one embodiment, given a desired probability, Probability_Desired, the web crawl interval can be expressed as:

Web_Crawl_Interval=Probability_Desired/(User_View_Rate*Document_Update_Rate).

In other words, the higher a user view rate and/or the document update rate, the smaller the web crawl interval must be to maintain the same relative probability (i.e., the document is crawled more frequently).

Alternatively, the user view rate can be expressed as a user impression rate, a user click rate or a combination of the two. An impression rate is the rate at which the user is presented with the document, which includes presentation of all or part of the document in a search result, whereas the user click rate represents when a user clicks on a document to have it presented. As a combination, the user impression rate would be combined with the user click rate multiplied by a weighting factor. The weighting factor allows a relationship to be created representing the relative worth of a click compared to an impression. For example, a click may be worth x impressions, where x varies from negative values to positive values.

There are different approaches for measuring the user click rate, such as using redirects from the origin application. However, the redirect approach may be unreliable due to various spam robots which may cause the click rate to be artificially inflated. The effects of such could be reduced by, for example, using unique session identification information based on IP or cookie information. Alternatively, an application such as Google's NavClient could be used, which is more resistant to spam attacks than the direct approach.

It would be desirable to accurately estimate an update rate of a particular document to be crawled. Every document on the Internet has an associated document update rate and, as mentioned earlier, some documents are updated more frequently than others. If an estimated document update rate used to determine how frequently a document is crawled is much higher than the actual document update rate, then a too small web crawl interval will be determined. Therefore, a later crawl of the document at that smaller interval is likely to retrieve a copy of the document content that is substantially or materially the same as the previous crawl(s). This unnecessary crawl wastes valuable resources of the search engine. On the other hand, an estimated document update rate that is much lower than the actual document update rate results in a longer than necessary web crawl interval. This may cause the search engine to match a user query to stale data of a document because the search engine has not indexed the current version of the document.

A highly desirable situation would be that the search engine crawls a document right after its update. However, this would require that a web server notify the web search engine every time it updates a document. A more practical approach is to crawl the document at a rate that is close to its "actual" update rate.

As described in reference to FIG. 3 above, a dynamic process to approach the near-"actual" update rate of a document, would include the following steps:

1. Crawling a URL to fetch a new copy of the document's content; and
2. Comparing the new content with an old content of the document to determine if the content has changed, and if so, to what extent.

There are two possible outcomes from the comparison:
1. There is no change (or at least no material change) to the document during the web crawl interval; and
2. There is a content change (or at least a material change) to the document during the web crawl interval.

In the first case, the newly completed crawl does not retrieve any new information about the document and to a certain degree, it is a waste of the search engine's limited crawling resources. In the second case, the newly completed crawl does acquire new information about the document. In this sense, such a crawl is not a waste. However, it indicates that there must be a delay between the time when the document was updated and the time when the document was crawled even though the extent of such delay is unknown. Without knowledge of the exact update time of a document, a desirable web crawl interval for the document is the one that, when applied, alternates between the two possible outcomes.

If there are two consecutive no-change outcomes, the web crawl interval is deemed too small and at least one of the two crawls could have been avoided to save crawling resources. Accordingly, the desirable web crawl interval should be increased. If there are two consecutive change outcomes, the web crawl interval is deemed too large and the risk that a document is "seen stale" has increased. Accordingly, the desirable web crawl interval should be decreased. A number of methodologies can be envisioned for producing these type of modifications to the web crawl rate. For example, the Nyquist sampling law familiar to those involved with signal processing could be applied. According to the Nyquist sampling law, a signal having a period T should be sampled at least twice during each period in order to avoid information loss. In the case of web crawling, a document that is updated every N seconds should be sampled twice during each N seconds. In other words, a desirable web crawl interval would be N/2 seconds. The determination of a desirable web crawl interval is further made more difficult by the fact that a particular document's update rate may vary in time. As a consequence, the desired web crawl interval may vary over time.

In one embodiment, a dynamic desirable web crawl interval is determined as follows. Given that a web crawl interval is $T_1$, if the document crawled at interval $T+T_1$ shows that the document has been changed, then the web crawl interval is modified to be half of the previous interval, i.e., $T_1/2$. If there is no change to the document after the web crawl interval is halved, the desirable web crawl interval is modified to be somewhere between $T_1/2$ and $T_1$, e.g., the average of the two intervals, $3 T_1/4$. An iterative process can be used to refine the desired web crawl interval. Different embodiments may select the initial web crawl interval in different ways. For example, the initial web crawl interval could be determined to be the average actual or average desired change interval for all documents, for all documents determined to be in a similar tier, or documents having a similarity to the document under consideration. In other embodiments, the initial web crawl interval could be based, at least in part, on a document's popularity or importance (e.g., as measured by the document's pagerank). For example, two documents in the same tier, but with different pageranks, may be assigned different initial web crawl intervals in accordance with their respective pageranks.

The term "pagerank" is used in this document mean a document importance score. PageRank is just one example of a document importance score. A detailed description of the PageRank algorithm can be found in the article "The Anatomy of a Large-Scale Hypertextual Search Engine" by S. Brin and L. Page, 7th International World Wide Web Conference, Brisbane, Australia and U.S. Pat. No. 6,285,999, both of which are hereby incorporated by reference as background information.

In another embodiment, an average interval between changes is compared to an average interval between no changes. If the average interval between crawls where no change was detected is greater than the average interval between crawls where a change was detected, the crawl interval may be close to the desired crawl interval. The interval could be maintained, or could be modified in accordance with the last comparison of the document with its prior version. For example, if the last comparison detected a change, then the web crawl interval may be changed to be the average interval between crawls where change was detected. On the other hand, if the last comparison detected no change, then the web crawl interval may be changed to be the average interval between crawls where no change was detected.

If the average interval between crawls where no change was detected is less than the average interval between crawls where a change was detected, it suggests that the desired crawl interval is between the two averages. Accordingly, the new web crawl interval may be chosen to be the average of the two averages.

The desired web crawl interval can be combined with other information to provide a score used to determine the crawling order for the documents to be crawled by a web search engine. The score takes into account various inputs to create a web crawl priority in order to reduce the probability of stale content to a desired level. For example, a document with a higher web crawl priority would receive more frequent visits from the search engine's web crawlers, resulting in a higher likelihood that the content is not stale.

In reality there are a huge number of documents competing for the limited web crawl capacity of a search engine. Therefore, it is practically inevitable that some documents will have stale content and will be presented to a user in a search result. The search engine can consider each document's pagerank, user click rate, and content update rates and/or other information, and provide an appropriate web crawl priority to the document so that the resultant probability of a document being seen "dirty", i.e., the document's stale content being used in response to a search query, is below an acceptable level. In other words, a document's web crawl priority will determine its web crawl order relative to other documents competing for a search engine's limited web crawl capacity.

It should be noted that a document's desired web crawl interval is not necessarily identical to the document's actual web crawl interval. For example, the priority given to a certain document may not allow it to be crawled at the desired interval. Or, if documents are grouped in tiers, that too may affect the actual crawl interval. As a result, a document's actual web crawl interval may be longer than the desired web crawl interval. However, the difference between the two web crawl intervals does not adversely affect the role played by the desired web crawl interval in a significant way. Generally, the shorter the web crawl interval of a document, the higher its web crawl priority.

A generic relationship between the probability of a document being seen stale and its pagerank, user click rate, content update rate and web crawl interval can be expressed as:

$$P_{stale} = f(PR_{pagerank}, T_{click\_rate}, T_{content\_update\_rate}, T_{web\_crawl}).$$

where $P_{stale}$ represents a probability that the document is searched, or seen, in its stale state; $PR_{pagerank}$ represents the pagerank or importance of the document; $T_{click\ rate}$ represents the rate at which users click on the document; $T_{content\ update\ rate}$ represents the rate at which the document is updated by its web server; and $T_{web\ crawl}$ represents the desired web crawl interval. The exact mathematical expression of the function $f$ is relatively arbitrary depending on how much weight each of the four parameters is allocated by the search engine in determining the probability. However, there is a set of qualitative features characterizing this relationship shared by any particular mathematical expression. For example, if the pagerank, the content update rate and the desired web crawl interval of a document are treated as fixed quantities, an increase in the user click rate will result in a higher probability of the document being seen, or searched, as stale from the search engine. Similarly, an increase in a document's content update rate, while holding fixed the other parameters, will increase the probability of stale content from the document being seen. An increase in the web crawl interval, while holding fixed the other parameters, will also increase the probability of stale content from the document being seen.

The impact of a document's pagerank on its probability of being seen stale is similar to that of the user click rate. A document's pagerank is often correlated with its user click rate, because the pagerank is indicative of the document's popularity or importance. The more popular a document is, the more visits it receives per unit of time period.

In one embodiment, the $P_{stale}$ score is used to order the crawl of documents. In this embodiment, documents are crawled in decreasing order of the probability that they will be seen in their stale state.

As noted above, a document may be thought of as a collection of features which may be individually updated from time to time. As such, each feature may or may not be modified from the previous crawl. Each feature could have a feature change interval associated with it measured and stored as discussed above. The feature change intervals can be used to construct a document change interval where each feature is given a different weight depending on its desired importance, or other factors. For example, the document change interval could be determined by:

$$\text{document\_interval} = \sum_{i=0}^{n-1} \text{weight}_i * \text{feature\_interval}_i$$

where n is the number of features. This change interval could then be used as described above in determining the desired web crawl interval.

Figure 4:
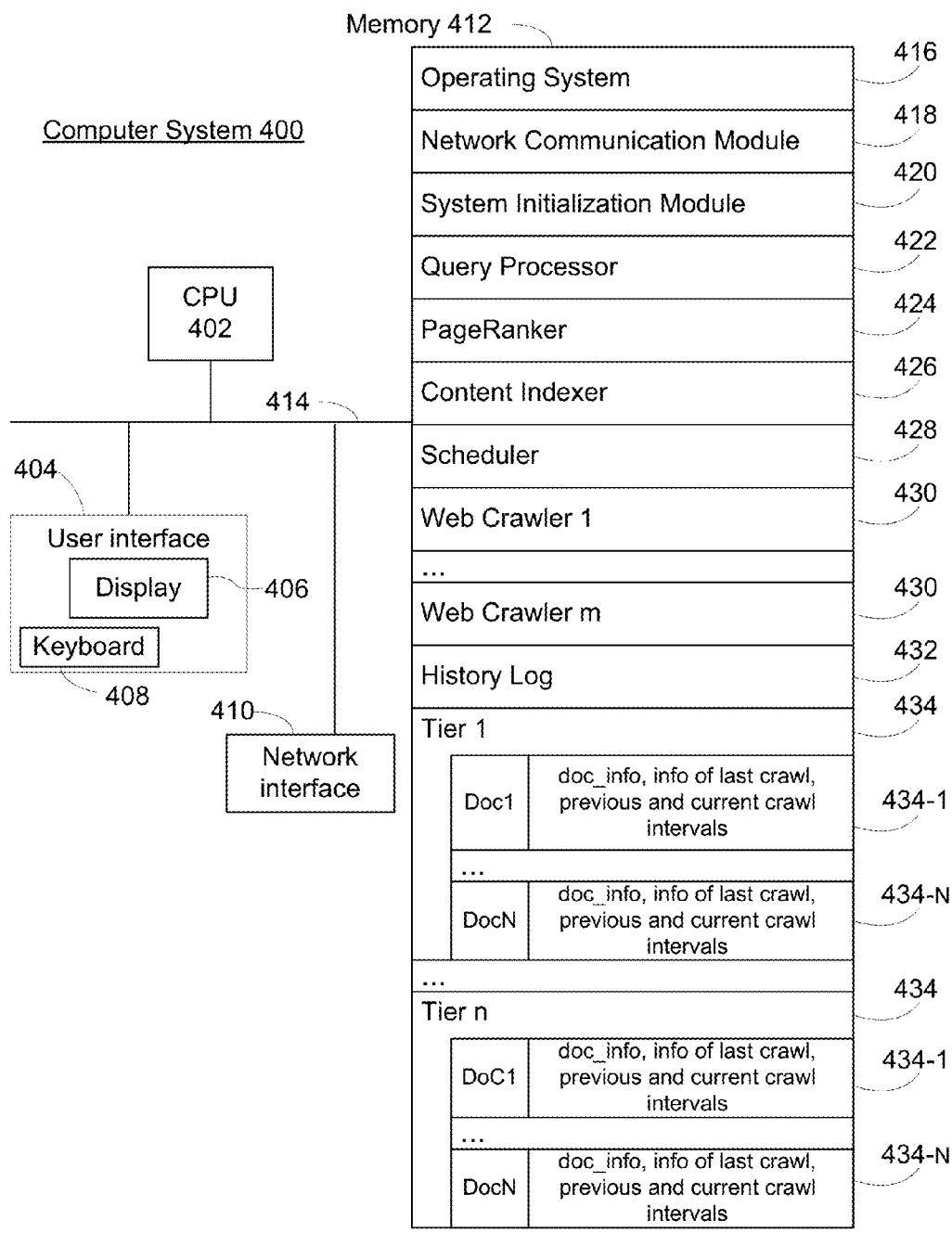
FIG. 4 illustrates a computer-based search engine system in accordance with an embodiment.

FIG. 4 illustrates an embodiment of a computer-based search engine system 400 that implements the web crawl interval update strategy discussed above. The system 400 includes one or more processing units (CPU's) 402, one or more network or other communications interfaces 410, memory 412, and one or more communication buses 414 for interconnecting these components. The system 400 may optionally include a user interface 404 comprising a display device 406 and a keyboard 408. Memory 412 may include high speed random access memory and may also include non-volatile memory, such as one or more magnetic disk storage devices. Memory 412 may include mass storage that is remotely located from the CPU's 402. The memory 412 stores:

- an operating system 416 that includes procedures for handling various basic system services and for performing hardware dependent tasks;
- a network communication module (or instructions) 418 for connecting the computer system 400 to other computers via the one or more communication network interfaces 410 (wired or wireless), such as the Internet, other wide area networks, local area networks, metropolitan area networks, and so on;
- a system initialization module (or instructions) 420 that initializes other modules and data structures stored in memory 412 required for the appropriate operation of the computer system 400;
- a query processor 422 for receiving and processing search queries submitted from various client computers, and then organizing and transmitting search results back to the corresponding client computers;
- a pageranker 424 for calculating a content-independent and structure-based pagerank of a document that is used for representing the document's relative popularity;
- a content indexer 426 for generating a set of inverted content indexes for a document based on its current content;
- a scheduler 428 for dispatching web crawlers in response to web crawling requests and determining a new web crawl interval for a crawled document;
- one or more web crawlers 430 for retrieving documents from various hosting web servers;
- a history log database 432 for storing previous web crawling results of each document; and
- one or more multi-tier databases 434, each database managing a certain number of documents' web crawl requests.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

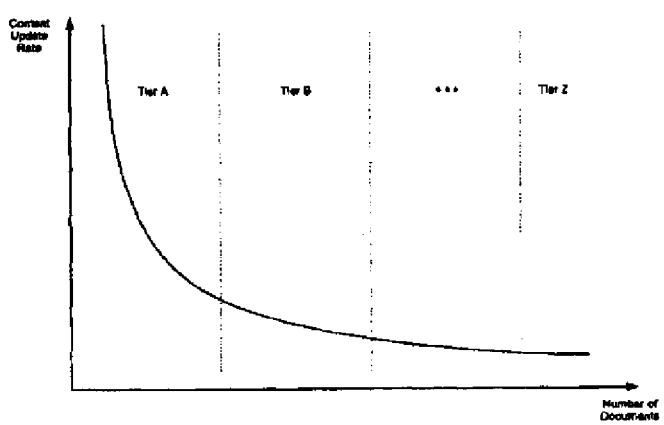

What is claimed is:

1. A method for scheduling a document crawl interval, comprising:
    at a computer system having one or more processors and a memory storing one or more programs for execution by the one or more processors:
    comparing a first instance of a document in a plurality of documents with a second instance of the document, thereby obtaining a document comparison, wherein the first instance of the document is obtained from a remote location at a specified time before the second instance of the document is obtained from the remote location and wherein
        (i) the specified time is determined in accordance with a first crawl interval associated with the document,
        (ii) each document in the plurality of documents is assigned to a crawl-scheduling tier in a plurality of crawl-scheduling tiers, each crawl-scheduling tier in the plurality of crawl-scheduling tiers having a distinct associated range of web crawl intervals, and
        (iii) the first crawl interval is assigned a first crawl-scheduling tier in the plurality of crawl-scheduling tiers; and computing a second crawl interval for the document, wherein the second crawl interval is a function of the document comparison; and determining whether the second crawl interval is in the crawl-scheduling first tier, wherein, when the second crawl interval is not in the crawl-scheduling first tier, the first document is reassigned to a crawl-scheduling tier in the plurality of crawl-scheduling tiers other than the first crawl-scheduling tier.

2. The method of claim 1, wherein comparing the first instance with the second instance includes comparing a document fingerprint of the first instance with a document fingerprint of the second instance.

3. The method of claim 1, wherein the first instance of the document is unchanged with respect to the second instance of the document.

4. The method of claim 1, wherein the first instance of the document is changed compared to the second instance of the document.

5. The method of claim 1, wherein the first instance of the document is changed with respect to the second instance of the document and wherein the second crawl interval for the document is less than the first crawl interval.

6. The method of claim 1, wherein the document comparison produces a result corresponding to a change between the first instance and the second instance, and the result is one of: no change, a critical change, and a non-critical change.

7. The method of claim 1, wherein the document includes a plurality of portions, each portion in the plurality of portions is associated with a comparison weight, and comparing the first instance of the document with the second instance of the document uses a comparison weight associated with a portion included in the document.

8. The method of claim 1, wherein the second crawl interval is also a function of the first crawl interval.

9. The method of claim 1, wherein computing the second crawl interval for the document includes:
in accordance with a determination that the document has changed, reindexing the document; and computing the second crawl interval in accordance the document change.

10. The method of claim 1, wherein computing the second crawl interval for the document includes:
in accordance with a determination that the document has not changed, reusing the document; and computing the second crawl interval in accordance the determination that the document has not changed.

11. The method of claim 1, wherein computing the second crawl interval for the document includes:
in accordance with a determination that the document has not changed, reusing the document; and computing the second crawl interval in accordance the determination that the document has not changed.

12. The method of claim 1, wherein the second crawl interval for the document is associated with a lesser likelihood that a user will see stale content of the document.

13. The method of claim 1, wherein a crawl interval for the document is determined using a desired likelihood that a user will not see stale content of the document, a user view rate of the document, and a document update rate of the document.

14. The method of claim 13, wherein the user view rate of the document is determined using a user impression rate of the document, and a user click rate of the document.

15. The method of claim 14, wherein the user impression rate of the document corresponds to a rate at which at least a portion of the document is presented to the user, and the user click rate of the document corresponds to a rate at which the document is clicked by the user.

16. The method of claim 14, wherein the user click rate of the document is calculated using a number of redirects to the document from another application.

17. The method of claim 13, wherein the desired likelihood that a user will not see stale content of the document is calculated using the document's page rank, the document's user click rate, the document's content update rate, the document's desired crawl interval.

18. The method of claim 17, further comprising: determining crawling order for the document in accordance with the desired likelihood that a user will not see stale content of the document.

19. The method of claim 1, wherein the steps recited in claim 1 are executed in response to obtaining a notification that the document has been updated.

20. The method of claim 1, further comprising:
in accordance with a first document comparison having a result that the document has not changed, and a second document comparison having a result that the document has not changed:
increasing crawl interval for the document.

21. The method of claim 20, wherein the first document comparison and the second document comparison are consecutive.

22. The method of claim 1, further comprising:
in accordance with a first document comparison having a result that the document has changed, and a second document comparison having a result that the document has not changed:
decreasing crawl interval for the document.

23. The method of claim 22, wherein the first document comparison and the second document comparison are consecutive.

24. The method of claim 1, further comprising: increasing or decreasing crawl interval for the document in accordance with a Nyquist sampling law.

25. The method of claim 1, further comprising: determining an initial crawl interval for the document in accordance with the document's importance score.

26. The method of claim 1, further comprising: determining a desired crawl interval for the document using: (i) average interval between crawls where the document has not change and (ii) the average interval between crawls where the document has changed.

27. The method of claim 26, wherein the desired crawl interval for the document is the average of (i) average interval between crawls where the document has not changed and (ii) the average interval between crawls where the document has changed.

28. The method of claim 26, further comprising: determining crawling order for the document in accordance with the document's desired crawl interval.

29. The method of claim 24, further comprising: determining crawling order for the document also in accordance with the document's crawling priority.

30. The method of claim 1, wherein the document corresponds to a plurality of features, each feature in the plurality of features is associated with a feature change interval and a importance score; and further comprising:
determining the document's crawling interval using a respective feature's feature change interval and importance score.

31. A computer system comprising:
one or more processors;
a memory storing one or more programs for execution by the one or more processors, wherein the one or more programs comprising instructions for:
comparing a first instance of a document in a plurality of documents with a second instance of the document, thereby obtaining a document comparison, wherein the first instance of the document is obtained from a remote location at a specified time before the second instance of the document is obtained from the remote location and wherein
  (i) the specified time is determined in accordance with a first crawl interval associated with the document,
  (ii) each document in the plurality of documents is assigned to a crawl-scheduling tier in a plurality of crawl-scheduling tiers, each crawl-scheduling tier in the plurality of crawl-scheduling tiers having a distinct associated range of web crawl intervals, and
  (iii) the first crawl interval is assigned a first crawl-scheduling tier in the plurality of crawl-scheduling tiers; and
computing a second crawl interval for the document, wherein the second crawl interval is a function of the document comparison; and
determining whether the second crawl interval is in the crawl-scheduling first tier, wherein, when the second crawl interval is not in the crawl-scheduling first tier, the first document is reassigned to a crawl-scheduling tier in the plurality of crawl-scheduling tiers other than the first crawl-scheduling tier;
determining whether the second crawl interval is in the first tier, wherein, when the second crawl interval is not in the first tier, the first document is reassigned to a tier in the plurality of tiers other than the first tier.

32. A non-transitory computer readable storage medium storing one or more programs to be executed by a computer system, the one or more programs comprising instructions for:
comparing a first instance of a document in a plurality of documents with a second instance of the document, thereby obtaining a document comparison, wherein the first instance of the document is obtained from a remote location at a specified time before the second instance of the document is obtained from the remote location and wherein
  (i) the specified time is determined in accordance with a first crawl interval associated with the document,
  (ii) each document in the plurality of documents is assigned to a crawl-scheduling tier in a plurality of crawl-scheduling tiers, each crawl-scheduling tier in the plurality of crawl-scheduling tiers having a distinct associated range of web crawl intervals, and
  (iii) the first crawl interval is assigned a first crawl-scheduling tier in the plurality of crawl-scheduling tiers; and
computing a second crawl interval for the document, wherein the second crawl interval is a function of the document comparison; and
determining whether the second crawl interval is in the crawl-scheduling first tier, wherein, when the second crawl interval is not in the crawl-scheduling first tier, the first document is reassigned to a crawl-scheduling tier in the plurality of crawl-scheduling tiers other than the first crawl-scheduling tier.

\* \* \* \* \*

UNITED STATES PATENT AND TRADEMARK OFFICE
CERTIFICATE OF CORRECTION

| | | |
|---|---|---|
| PATENT NO. | : 8,782,032 B2 | |
| APPLICATION NO. | : 13/849355 | |
| DATED | : July 15, 2014 | |
| INVENTOR(S) | : Carver | |

It is certified that error appears in the above-identified patent and that said Letters Patent is hereby corrected as shown below:

On the Title Page

Delete Title Page, and replace with new Title Page. (attached)

In the Claims

Claim 9, col. 11, line 40, please delete "accordance the" and insert --accordance with the--; and Claim 10, col. 11, line 46, please delete "accordance the" and insert --accordance with the--; and Please delete claim 11 in its entirety; and Claim 26, col. 12, line 45, please delete "change and" and insert --changed and--.

Signed and Sealed this
Twenty-first Day of October, 2014

Michelle K. Lee
*Deputy Director of the United States Patent and Trademark Office*

CERTIFICATE OF CORRECTION (continued)

(12) United States Patent
Carver

(10) Patent No.: US 8,782,032 B2
(45) Date of Patent: Jul. 15, 2014

(54) MINIMIZING VISIBILITY OF STALE CONTENT IN WEB SEARCHING INCLUDING REVISING WEB CRAWL INTERVALS OF DOCUMENTS

(71) Applicant: Google Inc., Mountain View, CA (US)

(72) Inventor: Anton P. T. Carver, Mountain View, CA (US)

(73) Assignee: Google Inc., Mounain View, CA (US)

(*) Notice: Subject to any disclaimer, the term of this patent is extended or adjusted under 35 U.S.C. 154(b) by 0 days.

(21) Appl. No.: 13/849,355

(22) Filed: Mar. 22, 2013

(65) Prior Publication Data
US 2013/0226897 A1 Aug. 29, 2013

Related U.S. Application Data

(63) Continuation of application No. 13/166,757, filed on Jun. 22, 2011, now Pat. No. 8,407,204, which is a continuation of application No. 10/930,280, filed on Aug. 30, 2004, now Pat. No. 7,987,172.

(51) Int. Cl.
*G06F 17/30* (2006.01)

(52) U.S. Cl.
CPC .................... *G06F 17/30864* (2013.01)
USPC ............ 707/709; 707/803; 709/217; 709/224

(58) Field of Classification Search
CPC ............ G06F 17/30864; G06F 17/30221; G06F 17/30661; G06F 17/30011; G06F 17/30867
USPC .......... 707/709, 706, 708, 710, 803, E17.108, 707/E17.116, E17.117; 709/217, 224
See application file for complete search history.

(56) References Cited

U.S. PATENT DOCUMENTS

| | | | |
|---|---|---|---|
| 4,312,009 A | 1/1982 | Lange | |
| 5,521,140 A | 5/1996 | Matsuda et al. | |

(Continued)

FOREIGN PATENT DOCUMENTS

| | | |
|---|---|---|
| WO | WO 01/50320 | 7/2001 |
| WO | WO 01/86507 | 11/2001 |

OTHER PUBLICATIONS

Hadrien Bullot, M. K. Mohania and S.K. Gupta "A data-mining approach for optimizing performance of an incremental crawler" -Web Intelligence, 2003. WI 2003, Oct. 13-17, 2003. Proceedings. IEEE/WIC International Conference on—(pp. 1-7 or 610-615).*

(Continued)

*Primary Examiner* — Anh Ly
(74) *Attorney, Agent, or Firm* — Morgan, Lewis & Bockius LLP

(57) ABSTRACT

A method includes comparing a first instance with a second instance of a document in a plurality of documents. The first instance is obtained from a remote location at a specified time before the second instance is obtained from the remote location, and (i) the specified time is determined in accordance with a first crawl interval associated with the document, (ii) each document in the plurality of documents is assigned to a tier in a plurality of tiers, each tier having a distinct associated range of web crawl intervals, and (iii) the first crawl interval is assigned a first tier. The method also includes computing a second crawl interval for the document, which is a function of the document comparison; and determining whether the second crawl interval is in the first tier. When the second crawl interval is not, the first document is reassigned to another tier.

31 Claims, 4 Drawing Sheets